(12) United States Patent
Fang et al.

(10) Patent No.: US 11,338,920 B2
(45) Date of Patent: May 24, 2022

(54) METHOD FOR GUIDING AUTONOMOUSLY MOVABLE MACHINE BY MEANS OF OPTICAL COMMUNICATION DEVICE

(71) Applicant: BEIJING WHYHOW INFORMATION TECHNOLOGY CO., LTD, Beijing (CN)

(72) Inventors: Jun Fang, Xi'an (CN); Xuheng Niu, Beijing (CN); Jiangliang Li, Beijing (CN)

(73) Assignee: BEIJING WHYHOW INFORMATION TECHNOLOGY CO., LTD., Beijing (CN)

( * ) Notice: Subject to any disclaimer, the term of this patent is extended or adjusted under 35 U.S.C. 154(b) by 85 days.

(21) Appl. No.: 17/089,709

(22) Filed: Nov. 4, 2020

(65) Prior Publication Data

US 2021/0047038 A1 Feb. 18, 2021

Related U.S. Application Data

(63) Continuation of application No. PCT/CN2019/085999, filed on May 8, 2019.

(30) Foreign Application Priority Data

May 9, 2018 (CN) .......................... 201810435228.1

(51) Int. Cl.
*B64C 39/02* (2006.01)
*G05D 1/00* (2006.01)
(Continued)

(52) U.S. Cl.
CPC ......... *B64C 39/024* (2013.01); *G05D 1/0094* (2013.01); *H04N 5/2353* (2013.01);
(Continued)

(58) Field of Classification Search
CPC ............ B64C 39/024; B64C 2201/127; B64C 2201/146; G05D 1/0094; H04N 5/2353; H04N 5/3532
(Continued)

(56) References Cited

U.S. PATENT DOCUMENTS 9,536,216 B1 1/2017 Lisso
2014/0320318 A1 10/2014 Victor et al.
(Continued)

FOREIGN PATENT DOCUMENTS

CN 1164048 C 8/2004
CN 103149939 A 6/2013
(Continued)

OTHER PUBLICATIONS

Supplementary European Search Report issued in corresponding European Application No. EP 19800859.1, completed on Dec. 16, 2021, 10 pages.
(Continued)

*Primary Examiner* — Allen C Wong
(74) *Attorney, Agent, or Firm* — Bayes PLLC

(57) ABSTRACT

A method for guiding an autonomously movable machine by means of an optical communication device having associated identification, location and orientation information. The method includes: receiving location information of a destination to which the autonomously movable machine travels, where the location information of the destination is determined by scanning and identifying, at the destination, at least one optical communication device around the destination; scanning and identifying the at least one optical communication device around the autonomously movable machine by means of the camera mounted on the autonomously movable machine, so as to determine location information of the autonomously movable machine; and on the
(Continued)

Scanning line

Mobile phone basis of the location information of the destination and the location information of the autonomously movable machine, determining the relative location relationship between the autonomously movable machine and the destination, and controlling the autonomously movable machine or a part thereof to travel to the destination.

20 Claims, 8 Drawing Sheets

(51) Int. Cl.
  *H04N 5/235* (2006.01)
  *H04N 5/353* (2011.01)
(52) U.S. Cl.
  CPC ..... *H04N 5/3532* (2013.01); *B64C 2201/127* (2013.01); *B64C 2201/146* (2013.01)
(58) Field of Classification Search
  USPC .......................................................... 701/3
  See application file for complete search history.

(56) References Cited

U.S. PATENT DOCUMENTS

| | | | |
|---|---|---|---|
| 2016/0122038 A1* | 5/2016 | Fleischman | B64C 39/024 244/114 R |
| 2016/0139234 A1 | 5/2016 | Ganick et al. | |
| 2017/0261975 A1 | 9/2017 | Liu et al. | |
| 2019/0250643 A1* | 8/2019 | Takizawa | B64C 13/20 |

FOREIGN PATENT DOCUMENTS

| | | | |
|---|---|---|---|
| CN | 104661000 | A | 5/2015 |
| CN | 105000194 | A | 10/2015 |
| CN | 105973236 | A | 9/2016 |
| CN | 106153057 | A | 11/2016 |
| CN | 106225787 | A | 12/2016 |
| CN | 205808421 | U | 12/2016 |
| CN | 205909832 | U | 1/2017 |
| CN | 106372701 | A | 2/2017 |
| CN | 106647814 | A | 5/2017 |
| CN | 106737687 | A | 5/2017 |
| CN | 107402396 | A | 11/2017 |
| CN | 107423786 | A | 12/2017 |
| CN | 107734449 | A | 2/2018 |
| CN | 107830863 | A | 3/2018 |
| EP | 0309962 | A2 | 4/1989 |
| JP | 2017037369 | A | 2/2017 |
| JP | 2017162435 | A | 9/2017 |

OTHER PUBLICATIONS

Notification of Reason for Refusal issued in corresponding Japanese Application No. JP2021-512991, dated Sep. 3, 2021, 7 pages.
Search Report issued in related Taiwan Application No. 108116065, dated Mar. 9, 2021, 14 pages.
Search Report issued in related Taiwan Application No. 108116065, dated Jan. 13, 2020, 4 pages.
Search Report issued in related Taiwan Application No. 108116065, dated Aug. 26, 2020, 4 pages.
International Search Report issued in corresponding International Application No. PCT/CN2019/085999, dated Jul. 29, 2019, 4 pages.

* cited by examiner

Period of time 1: turn on  Period of time 2: turn off  Period of time 3: turn on  Period of time 4: turn off

METHOD FOR GUIDING AUTONOMOUSLY MOVABLE MACHINE BY MEANS OF OPTICAL COMMUNICATION DEVICE

CROSS-REFERENCE TO RELATED APPLICATIONS

The present application is a by-pass continuation application of PCT International Application No. PCT/CN2019/085999 filed May 8, 2019, which claims priority to Chinese Patent Application No. 201810435228.1 filed on May 9, 2018, both of which are hereby incorporated by reference in their entireties.

TECHNICAL FIELD

The present disclosure relates to guidance of a machine capable of autonomous movement, and in particular to a method for guiding an autonomously movable machine by means of an optical communication device.

BACKGROUND

At present, a machine capable of autonomous movement (e.g., an unmanned aerial vehicle) is usually guided by technologies such as GPS and IMU, but these technologies are limited in positioning accuracy. For example, the GPS usually lead to an error of several meters or even tens of meters, and the signal propagation in the GPS will be affected by the operating environment, which often leads to a delay error. Therefore, by the existing navigation technologies, an unmanned aerial vehicle can only be guided to the vicinity of a target location (i.e., within tens of meters around the target location), but it is difficult to finally guide the unmanned aerial vehicle a very accurate target location.

In recent years, many manufacturers consider using unmanned aerial vehicles for goods distribution. For example, a goods delivery system using an unmanned aerial vehicle has been introduced in U.S. Pat. No. 9,536,216B1 by Amazon, wherein the unmanned aerial vehicle is navigated based on GPS and an altimeter, and remote human-aided navigation can be realized by a camera of the unmanned aerial vehicle. However, this system cannot realize the accurate navigation of the unmanned aerial vehicle. In another scheme disclosed by Amazon, an unmanned aerial vehicle is firstly guided to the vicinity of a destination by GPS, and then finds a unique "sign" in the field of view. This "sign" is an electronically identified welcome mat with a predetermined pattern placed at a good landing site by a customer. If the "sign" is found, the unmanned aerial vehicle will fly to the sign by visual guidance and put down the package. However, in this method, a buyer is required to have a yard suitable for receiving goods and place a unique "sign" in the yard. Moreover, since the "sign" itself cannot be used to distinguish different buyers, if a plurality of "signs" are placed near the destination by a plurality of buyers, the unmanned vehicle cannot determine to place the package at which "sign". Therefore, this scheme is not suitable for persons who live in urban apartments.

Conventional QR codes may be used to identify different users, but the distance to identify QR codes is very limited. For example, for a QR code, when it is scanned by a camera, the camera may usually be placed at a relatively close distance. The distance is usually about 15 times the width of the QR code. For example, for a QR code having a width of 20 cm, an unmanned aerial vehicle equipped with a camera can identify this QR code only when it travels to about 3 meters away from this QR code. Therefore, for long-distance identification, QR codes usually cannot be identified, or it is necessary to customize very large QR codes. However, the cost will be increased; and in many cases, it is impossible due to various other limitations (e.g., space size). Moreover, when identifying a QR code, the camera needs to directly face the QR code roughly for shooting; otherwise, the QR code cannot be identified if the deviation angle is too large.

SUMMARY

One aspect of the present disclosure relates to a method for guiding a machine capable of autonomous movement by optical communication devices, wherein the optical communication device has associated identification and location information, and a camera is mounted on the machine capable of autonomous movement; and, the method includes steps of: receiving location information of a destination to which the machine capable of autonomous movement travels, the location information of the destination being determined by scanning and identifying, at the destination, one or more optical communication devices around the destination; scanning and identifying, by the camera mounted on the machine capable of autonomous movement, one or more optical communication devices around the machine capable of autonomous movement to determine location information of the machine capable of autonomous movement; and, determining, based on the location information of the destination and the location information of the machine capable of autonomous movement, a relative location relationship between the machine capable of autonomous movement and the destination, and controlling the machine capable of autonomous movement or a portion thereof to travel to the destination.

In some embodiments, the identification information and location information of the optical communication devices are stored in a server.

In some embodiments, when traveling to the destination, the machine capable of autonomous movement determines its current location by scanning and identifying the optical communication devices around the machine capable of autonomous movement, so as to help the machine capable of autonomous movement to travel to the destination accurately.

In some embodiments, the scanning and identifying, by the camera mounted on the machine capable of autonomous movement, one or more optical communication devices around the machine capable of autonomous movement to determine location information of the machine capable of autonomous movement includes: identifying information transmitted by the optical communication device to obtain the identification information of the optical communication device; inquiring the location information of the optical communication device from the server by using the identification information; determining a relative location relationship between the machine capable of autonomous movement and the optical communication device; and, determining, based on the relative location relationship and the location information of the optical communication device, the location information of the machine capable of autonomous movement.

In some embodiments, the determining a relative location relationship between the machine capable of autonomous movement and the optical communication device includes: determining, based on an image of the optical communication device obtained by the machine capable of autonomous movement, a relative location relationship between the machine capable of autonomous movement and the optical communication device by relative positioning.

In some embodiments, the determining the location information of the destination by scanning and identifying, at the destination, one or more optical communication devices around the destination includes: identifying, by an imaging device with a camera that is located at the destination, information transmitted by the optical communication device to obtain the identification information of the optical communication device; inquiring the location information of the optical communication device from the server by using the identification information; determining a relative location relationship between the imaging device and the optical communication device; and, determining, based on the relative location relationship and the location information of the optical communication device, location information of the imaging device as the location information of the destination.

In some embodiments, the imaging device is held by a user or mounted on another machine.

In some embodiments, the identifying information transmitted by the optical communication device includes: acquiring multiple successive images of the optical communication device by the camera; for each image, determining whether there are stripes or what type of stripes exist in a portion of the image corresponding to the location of the light source; and, determining information represented by each image.

In some embodiments, the server is further configured to store size information and/or orientation information of the optical communication device, and the method further includes a step of: inquiring the size information and/or orientation information of the optical communication device from the server by using the identification information.

In some embodiments, the method further includes a step of firstly controlling the machine capable of autonomous movement to travel to the vicinity of the destination.

In some embodiments, the optical communication device includes a light source configured to be able to operate in at least two modes including a first mode and a second mode; in the first mode, an attribute of light emitted by the light source is controlled, by a light source control signal with a first frequency, to continuously change at the first frequency so that a stripe is presented on an image of the light source acquired when the light source is photographed by a rolling-shutter camera; and, in the second mode, no stripe or a stripe different from the stripe in the first mode is presented on the image of the light source acquired when the light source is photographed by the rolling-shutter camera.

In some embodiments, in the second mode, the attribute of light emitted by the light source is controlled, by a light source control signal with a second frequency different from the first frequency, to continuously change at the second frequency so that no stripe or a stripe different from the stripe in the first mode is presented on the image of the light source acquired when the light source is photographed by the rolling-shutter camera.

In some embodiments, in the second mode, the attribute of light emitted by the light source continuously changes at the first frequency, and a stripe different from the stripe in the first mode is presented on the image of the light source acquired when the light source is photographed by the rolling-shutter camera.

In some embodiments, the machine capable of autonomous movement includes a machine only a portion of which can move.

Another aspect of the present disclosure relates to a machine capable of autonomous movement, including a camera, a processor and a memory, the memory storing computer programs which, when executed by the processor, are capable of implementing the methods described above.

Another aspect of the present disclosure relates to a storage medium storing computer programs which, when executed, implement the methods described above.

BRIEF DESCRIPTION OF THE DRAWINGS

The embodiments of the present disclosure will be further described below with reference to the accompanying drawings, in which.

DETAILED DESCRIPTION

To make the objectives, technical schemes and advantages of the present disclosure clearer, the present disclosure will be further described below in detail by specific embodiments with reference to the accompanying drawings.

An optical communication device (also referred to as an "optical tag" herein) transmit different information by emitting different lights, and can realize a long identification distance. In the schemes of the present disclosure, a machine capable of autonomous movement (e.g., an unmanned aerial vehicle) is guided by means of an optical tag. For convenience of description, a type of optical tag identified by a CMOS imaging device will be described hereinafter by way of an example. However, it should be understood that optical tags of other types are also applicable to the guidance schemes of the present disclosure.

Figure 1:
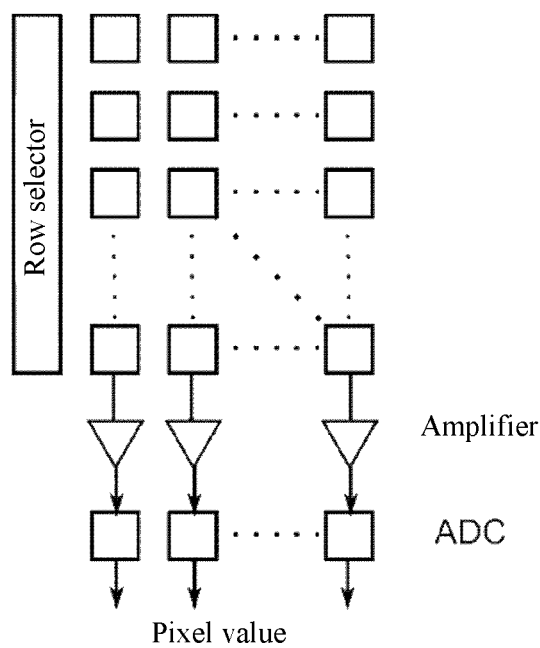
FIG. 1 is a schematic diagram of a CMOS imaging device.

CMOS imaging devices are widely used for imaging at present. As shown in FIG. 1, the CMOS imaging device includes an array of image sensing unit (also referred to as image sensors) and some other elements. The image sensor array may be a photodiode array, and each image sensor corresponds to one pixel. Each column of image sensors corresponds to a column amplifier. An output signal from the column amplifier is transmitted to an A/D converter (ADC) for analog-to-digital conversion and then output by an interface circuit. For any image sensor in the image sensor array, the image sensor is reset at the beginning of exposure, and the signal value is read out at the end of exposure. The CMOS imaging device usually uses a rolling-shutter imaging mode. In the CMOS imaging device, the readout of data is serial, so resetting/exposure/reading can only be performed sequentially row by row in a pipelined manner, and one image is synthesized after all rows of the image sensor array are processed. Therefore, the whole CMOS image sensor array is exposed row by row (in some cases, the CMOS image sensor array may also be exposed in multiple rows each time), resulting in a small delay among rows. Due to this small delay, when a light source flashes at a certain frequency, some stripes will be presented on images photographed by the CMOS imaging device.

An embodiment of the present disclosure relates to an optical communication device which can transmit different information by emitting different lights. The optical communication device is also referred to as an "optical tag" herein, and both of which can be used interchangeably throughout the present application. The optical communication device includes a light source and a controller. The controller is configured to control the light source to operate in two or more modes including a first mode and a second mode. In the first mode, a light source control signal has a first frequency, so that an attribute of light emitted by the light source continuously changes at the first frequency to transfer a first information; and in the second mode, the attribute of light emitted by the light source continuously changes at a second frequency or does not change to transfer a second information different from the first information.

In the present application, the attribute of light refers to any attribute that can be identified by an optical imaging device (e.g., a CMOS imaging device or a CCD imaging device). For example, the attribute may be an attribute perceptible to human eyes such as the intensity, color and wavelength of light, or other attributes imperceptible to human eyes such as the change in intensity of electromagnetic wavelength, color or wavelength beyond the visible range of human eyes, or any combination of these attributes. Therefore, the change of the attribute of light may be a change of a single attribute, or may be a change of a combination of two or more attributes. When the intensity of light is selected as the attribute, the change of the attribute of light can be realized simply by selectively turning on and off the light source. Hereinafter, for simplicity, the attribute of light is changed by turning on and off the light source; however, it should be understood that other methods for changing the attribute of light are also possible. It is to be noted that the attribute of the light changing at the first frequency in the first mode may be the same as or different from the attribute of the light changing at the second frequency in the second mode. In some embodiments, the attribute of the light changing in the first mode is the same as that of the light changing in the second mode.

Figure 2:
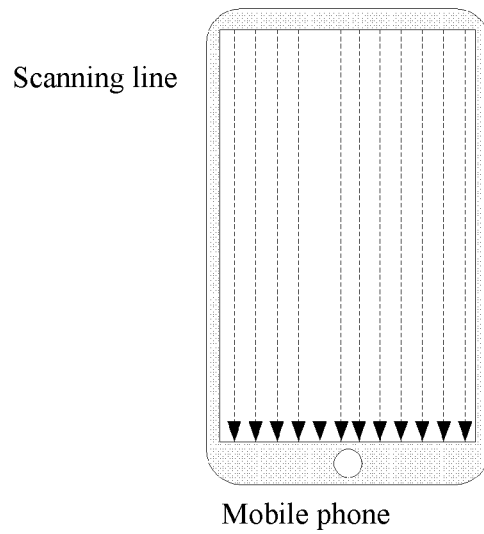
FIG. 2 is a directional diagram of acquiring images by the CMOS imaging device.

When the light source operates in the first mode or the second mode, the light source may be imaged by a rolling-shutter imaging device (for example, a CMOS imaging device or an apparatus equipped with the CMOS imaging device (e.g., a mobile phone, a tablet computer, a pair of intelligent glasses, etc.), i.e., being imaged by rolling a shutter. Hereinafter, the description will be given by using a mobile phone as the CMOS imaging device, as shown in FIG. 2. The row scanning direction of the mobile phone is shown as a vertical direction in FIG. 2; however, it should be understood that the row scanning direction may also be a horizontal direction according to different underlying hardware configurations.

The light source may be a light source in various forms as long as a certain attribute perceptible to the CMOS imaging device can change at a different frequency. For example, the light source may be an LED lamp, an array consisting of multiple LED lamps, a display screen or a portion thereof; or even, an illumination area of light (e.g., an illumination area of light on a wall) may also be used as a light source. The light source may be in various shapes, for example, a circular shape, a square shape, a rectangular shape, a strip shape, an L-shape or the like. The light source may include various common optical devices, for example, a light guide plate, a light softening plate, a diffuser or the like. In a preferred embodiment, the light source may be a two-dimensional array consisting of multiple LED lamps, with one dimension of the two-dimensional array being longer than the other, and the ratio of the two dimensions being about 6-12:1. For example, the LED lamp array may consist of multiple LED lamps that are arranged in one column. When emitting light, the LED lamp array may be shown as a substantially rectangular light source, and the operation of the light source is controlled by a controller.

Figure 3:
FIG. 3 shows a light source according to an embodiment of the present disclosure.
Figure 4:
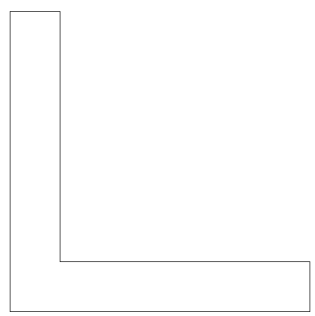
FIG. 4 shows a light source according to another embodiment of the present disclosure.

FIG. 3 shows a light source according to an embodiment of the present disclosure. When the light source shown in FIG. 3 is imaged by a CMOS imaging device, long sides of the light source shown in FIG. 3 may be perpendicular or substantially perpendicular to a row direction of the CMOS imaging image (e.g., the row scanning direction of the mobile phone shown in FIG. 2), so that as many stripes as possible are imaged under the same other conditions. However, since a user sometimes does not know the row scanning direction of the mobile phone, in order to ensure that the mobile phone can realize identification in various attitudes and that a maximum identification distance can be realized in both a vertical screen mode or a horizontal screen mode, the light source may be a combination of multiple rectangles, for example, an L-shaped light source shown in FIG. 4.

In another embodiment, the light source may not be limited to a planar light source, but may be implemented as a stereoscopic light source, for example, a strip-shaped cylindrical light source, a cubic light source or the like. For example, the light source may be placed on a square or suspended at a substantially central location in an indoor place (e.g., a dining room, a conference room, etc.), so that nearby users in various directions may photograph this light source by mobile phones so as to obtain the information transferred by this light source.

Figure 5:
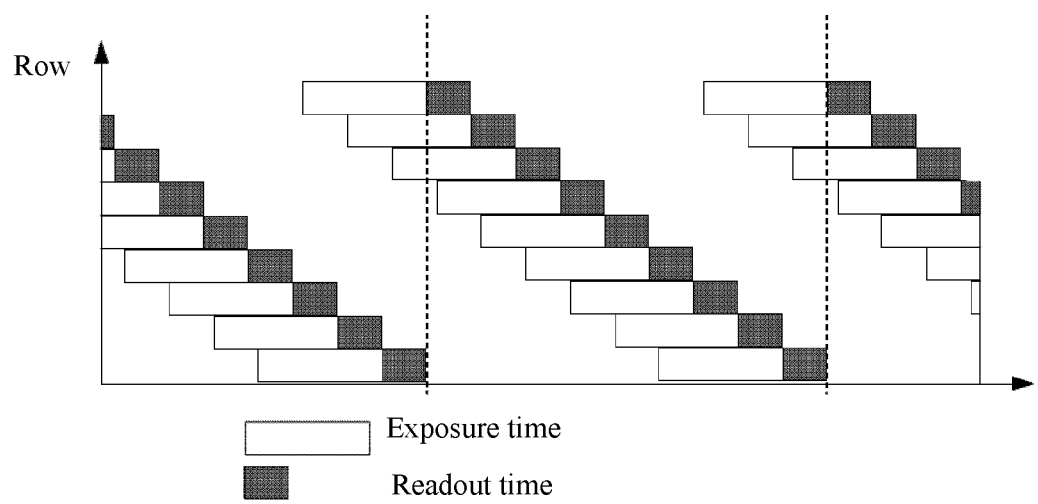
FIG. 5 is an imaging sequence diagram of the CMOS imaging device.

FIG. 5 shows an imaging sequence diagram of the CMOS imaging device, where each row corresponds to one row of sensors of the CMOS imaging device. During the imaging of each row of the CMOS imaging sensor array, two stages (i.e., exposure time and read-out time) are mainly involved. The exposure time for each row may be overlapped, but the readout time will not be overlapped.

It is to be noted that, only a few rows are schematically shown in FIG. 5, but an actual CMOS imaging device generally has thousands of rows of sensors depending upon different resolutions. For example, for a resolution of 1080 p, the CMOS imaging device has 1920×1080 pixels, where the numeral 1080 represents 1080 scanning rows and the numeral 1920 represents 1920 pixels per row. For the resolution of 1080 p, the readout time for each row is approximately 8.7 µs (i.e., $8.7 \times 10^{-6}$).

Figure 6:
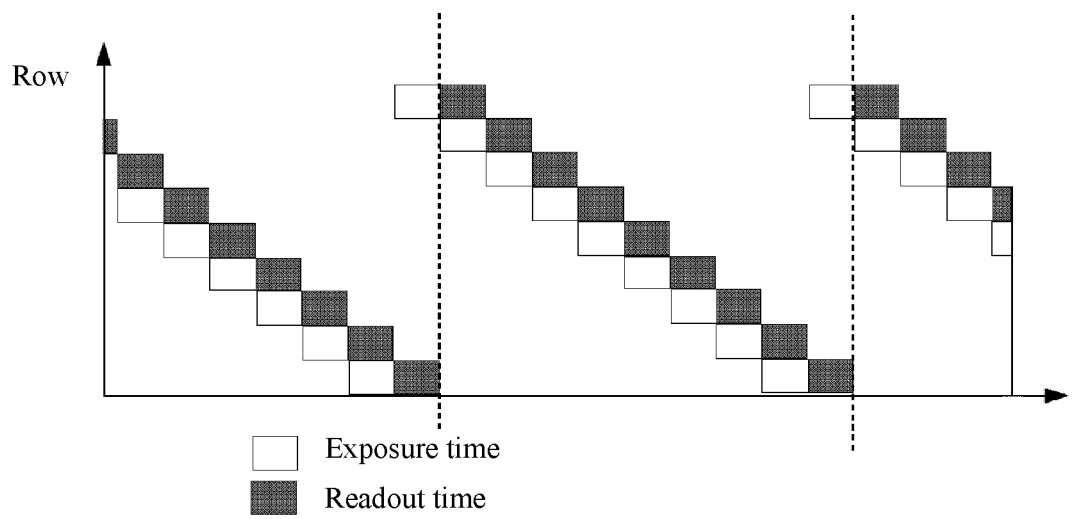
FIG. 6 is another imaging sequence diagram of the CMOS imaging device.

If there are many overlaps between the exposure times for adjacent rows due to too long exposure time, obvious transitional stripes may appear during imaging. For example, there are multiple pixel rows with different gray levels between a pure black pixel row and a pure white pixel row. In the present disclosure, it is desirable to present pixel rows as clearly as possible. Therefore, the exposure time of the CMOS imaging device (e.g., the mobile phone) is set or adjusted (e.g., by an APP installed in the mobile phone) to select a relatively short exposure time. In a preferred embodiment, the exposure time may be approximately equal to or less than the readout time for each row. By taking a resolution of 1080 p as an example, the readout time for each row is approximately 8.7 µs. In this case, it may be considered to adjust the exposure time of the mobile phone to about 8.7 µs or less. FIG. 6 shows an imaging sequence diagram of the CMOS imaging device in this case. In this case, the exposure time for each row do not basically overlapped or overlap less, so that stripes with clear boundaries can be obtained during imaging, which can be identified more easily. It is to be noted that FIG. 6 merely shows a preferred embodiment of the present disclosure, but a longer (e.g., equal to or less than two times, three times, four times or the like the readout time for each row) or shorter exposure time is also possible. For example, during the imaging process of stripe images shown in FIGS. 12 and 13 in the present application, the readout time for each row is approximately 8.7 µs and the set exposure time for each row is 14 µs. In addition, in order to present stripes, the duration of one cycle of the light source may be set to be about two or more times the exposure time, e.g., about four or more times the exposure time.

Figure 7:
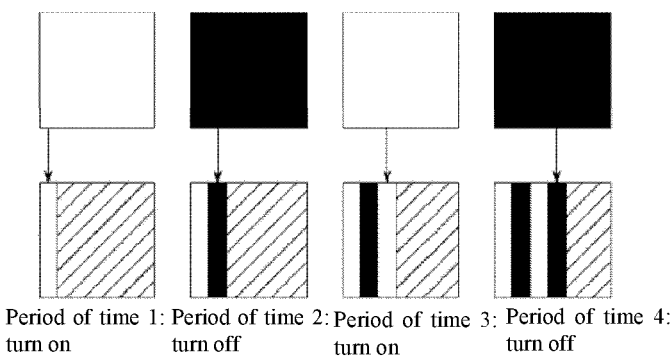
FIG. 7 shows an imaging diagram of the light source on the CMOS image device in different stages when the light source operates in a first mode.

FIG. 7 shows an imaging diagram of the light source on the CMOS imaging device in different stages when the controller controls the light source to operate in a first mode. In this first mode, the attribute of light emitted by the light source is changed at a certain frequency. In this embodiment, the change of the attribute of light is realized by turning on and off the light source.

The upper part of FIG. 7 shows a diagram of the state change of the light source in different stages, and the lower part of FIG. 7 shows an imaging diagram of the light source on the CMOS imaging device in different stages, where the row direction of the CMOS imaging device is a vertical direction and the scanning is performed from left to right. Since the image acquired by the CMOS imaging device is scanned row by row, when a high-frequency flicker signal is photographed, the stripe shown in the lower part of FIG. 7 will be formed in a portion of the acquired image corresponding to the imaging location of the light source. Specifically, in a period of time 1, the light source is turned on, and the left-most scanning row exposed in this period of time will present a bright stripe; in a period of time 2, the light source is turned off, and the scanning row exposed in this period of time will present a dark stripe; in a period of time 3, the light source is turned on, and the scanning row exposed in this period of time will present a bright stripe; and, in a period of time 4, the light source is turned off, and the scanning row exposed in this period of time will present a dark stripe.

Figure 8:
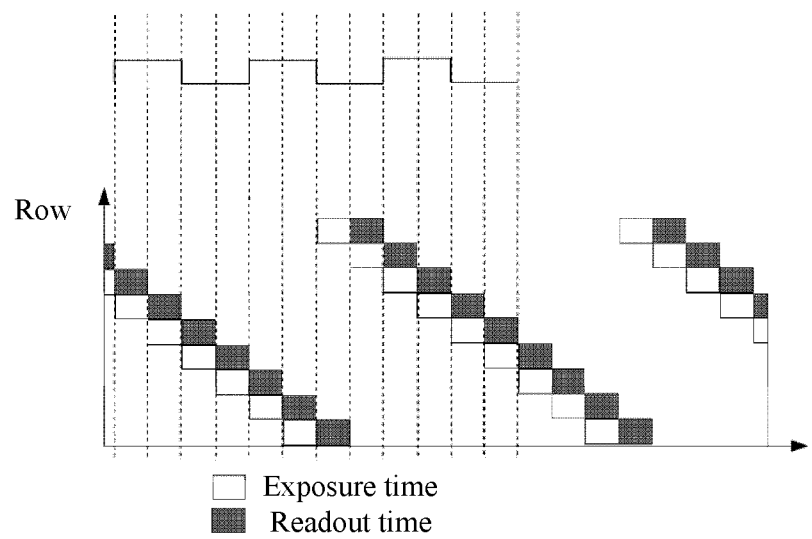
FIG. 8 shows an imaging sequence diagram of the CMOS imaging device when the light source operates in the first mode, according to an embodiment of the present disclosure.

The width of stripes may be adjusted by setting the flicker frequency of the light source by using a light source control signal, or setting the duration of each turn-on and turn-off of the light source. A longer duration of turn-on and turn-off generally corresponds to a wider stripe. For example, in the case shown in FIG. 6, if the duration of each turn-on and turn-off of the light source is set to be approximately equal to the exposure time for each row of the CMOS imaging device (the exposure time may be set by an APP installed in the mobile phone or set manually), stripes having a width of only one pixel may appear during imaging. In order to realize the long-distance identification of an optical tag, the stripes should be as narrow as possible. However, in practice, due to light interference, synchronization and other reasons, the stripes having a width of only one pixel are possibly unstable or difficult to identify. Therefore, in order to improve the stability of identification, stripes having a width of two pixels are preferable implemented. For example, in the case shown in FIG. 6, the duration of each turn-on and turn-off of the light source may be set to be approximately equal to about 2 times the exposure time for each row of the CMOS imaging device so as to realize stripes having a width of about two pixels, as specifically shown in FIG. 8, wherein the signal in an upper part of FIG. 8 is a light source control signal, a high level of which corresponds to the turn-on of the light source and a low level of which corresponds to the turn-off of the light source. In the embodiment shown in FIG. 8, the duty ratio of the light source control signal is set to be about 50% and the exposure time for each row is set to be approximately equal to the readout time for each row; however, it should be understood that other settings are also possible as long as distinguishable stripes can be presented. For simplicity of description, the light source and the CMOS imaging device are synchronized in FIG. 8, so that the time when the light source is turned on and the time when the light source is turned off approximately correspond to the start or end moment of the exposure time for a certain row of the CMOS imaging device. However, it should be understood that, even if the light source and the CMOS imaging device are not synchronized as in FIG. 8, it is also possible that obvious stripes are presented on the CMOS imaging device. In this case, there may be some transition stripes, but there is at least one a row exposed when the light source is always turned off (i.e., the darkest stripe) and a row exposed when the light source is always turned on (i.e., the brightest stripe), which are separated by one pixel. The change in brightness (i.e., stripes) of the pixel rows can be easily detected (for example, by comparing the brightness or gray level of some pixels in the imaging area of the light source). Furthermore, even if there are no row exposed when the light source is always turned off (i.e., the darkest stripe) and no row exposed when the light source is always turned on (i.e., the brightest stripe), if there are a row (i.e., a darker stripe) in which the turn-on time t1 of the light source during the exposure time is less than a certain time length or accounts for a small proportion of the whole exposure time and a row (i.e., a brighter stripe) in which the turn-on time t2 of the light source during the exposure time is greater than a certain time length or accounts for a large proportion of the whole exposure time, and t2−t1 is greater than a threshold of the difference between bright and dark stripes (e.g., 10 µs) or t2/t1 is greater than a threshold of the ratio of bright and dark stripes (e.g., 2), the change in brightness of the pixel rows can also be detected. The threshold of the difference between bright and dark stripes and the threshold of the ratio of bright and dark stripes are related to the luminous intensity of the optical tag, the properties of the photosensitive device, the shooting distance or the like. It should be understood that other thresholds are also possible as long as the stripes distinguishable by a computer can be presented. During the identification of stripes, the information (e.g., binary data 0 or 1) transferred by the light source at this time can be determined.

A method for identifying stripes according to an embodiment of the present disclosure is as follows: an image of an optical tag is acquired, and an imaging area of a light source is segmented in a projection manner; stripe pictures and stripe-free pictures in different configurations (e.g., at different distances, different light source flicker frequencies or the like) are collected; all the collected pictures are uniformly normalized to a particular size, e.g., 64*16 pixels; each pixel feature is extracted as an input feature to construct a machine learning classifier; and, dichotomous discrimination is performed to determine whether it is a stripe picture or a stripe-free picture. The stripe identification may also be performed by any other methods known in the art, and these methods will not be repeated here.

For a strip-shaped light source having a length of 5 cm, when the light source is photographed at a resolution of 1080 p and a distance of 10 m (that is, the distance is 200 times the length of the light source) by a mobile phone common in the current market, the strip-shaped light source will occupy about 6 pixels in its lengthwise direction. If the width of each stripe is 2 pixels, at least one obvious stripe will appear within the width range of the 6 pixels, and the at least one obvious stripe can be easily identified. If a higher resolution is set or a larger distance (for example, the distance is 300 to 400 times the length of the light source) is employed by optical zooming, stripes can also be identified.

Figure 9:
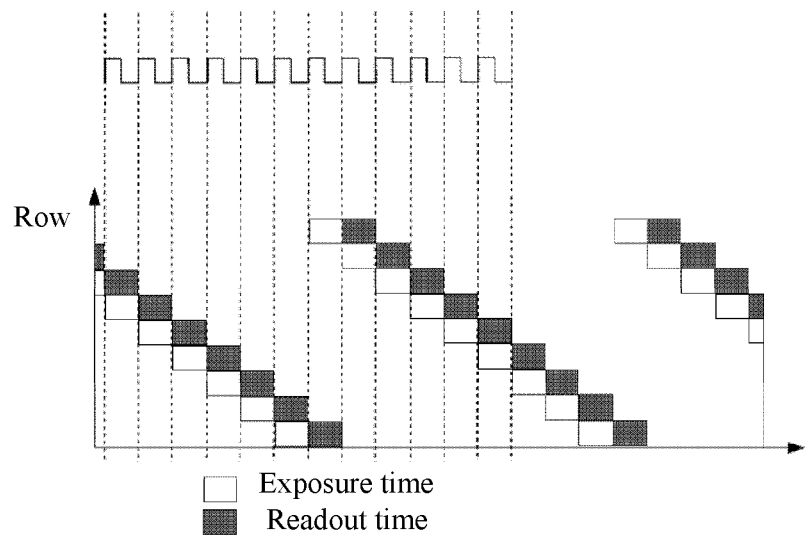
FIG. 9 shows an imaging sequence diagram of the CMOS imaging device when the light source operates in a second mode, according to an embodiment of the present disclosure.

The controller may also control the light source to operate in a second mode. In an embodiment, in the second mode, the light source control signal may have another frequency different from that in the first mode, so as to change the attribute of light emitted by the light source. For example, the change of the attribute of light is realized by turning on and off the light source. In an embodiment, compared with the first mode, the frequency at which the light source is turned on and off can be increased by the controller in the second mode. For example, the frequency in the first mode may be greater than or equal to 8000 times per second, and the frequency in the second mode may be greater than that in the first mode. In the case shown in FIG. 6, the light source may be configured in such a way that the light source is turned on and off for at least one time within the exposure time for each row of the CMOS imaging device. FIG. 9 shows a case where the light source is turned on and off for only one time within the exposure time for each row, where the signal in the upper part of FIG. 9 is a light source control signal, a high level of which corresponds to the turn-on of the light source and a low level of which corresponds to the turn-off of the light source. Since the light source will be turned on and off for one time in the same way within the exposure time for each row and the exposure intensity and energy obtained in each exposure time are approximately equal, there is no significant difference in brightness between pixel rows finally imaged by the light source, and there are no stripes. It should be understood that a higher turn-on or turn-off frequency is also possible. Additionally, for simplicity of description, the light source and the CMOS imaging device are synchronized in FIG. 9, so that the time when the light source is turned on approximately corresponds to the start moment of the exposure time for a certain row of the CMOS imaging device. However, it should be understood that, even if the light source and the CMOS imaging device are not synchronized as in FIG. 9, there is still no significant difference in brightness between pixel rows finally imaged by the light source, and there are no stripes. When stripes cannot be identified, the information (e.g., binary data 1 or 0) transferred by the light source at this time can still be determined. For human eyes, no flicker will be observed when the light source of the present disclosure operates in the first mode or the second mode. In addition, in order to avoid flickers that may be observed by human eyes during the switchover between the first mode and the second mode, the duty ratio in the first mode and the duty ratio in the second mode may be set to be approximately equal, so that an approximately equal luminous flux is realized in different modes.

In another embodiment, in the second mode, DC current may be provided to the light source so that the light source emits light with an attribute that basically does not change. Accordingly, no stripe will be presented on an image of the light source acquired when the light source is photographed by a CMOS image sensor. In addition, in this case, it is also possible to realize the approximately equal luminous flux in different modes, so that flickers that may be observed by human eyes during the switchover between the first mode and the second mode are avoided.

Figure 10:
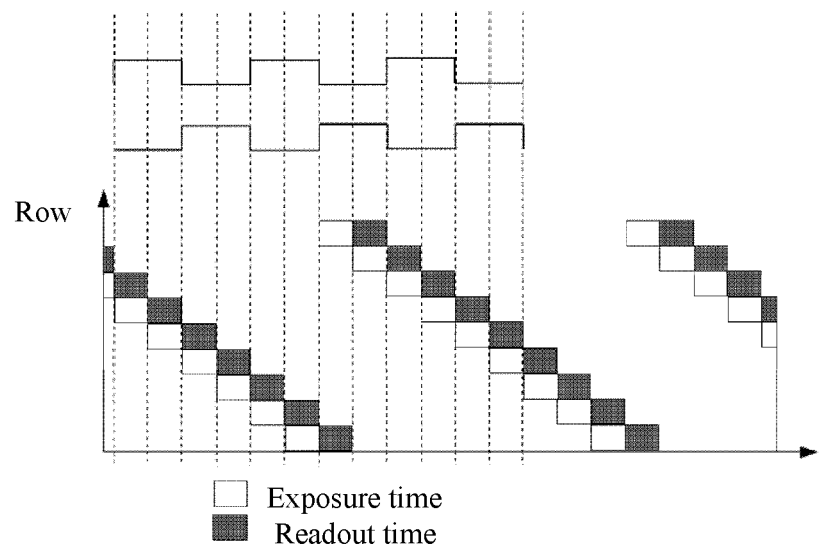
FIG. 10 shows an imaging sequence diagram of the CMOS imaging device when the light source operates in the first mode, according to another embodiment of the present disclosure.

FIG. 8 above shows an embodiment in which stripes are presented by changing the intensity of light emitted by the light source (for example, by turning on and off the light source). In another embodiment, as shown in FIG. 10, it is also possible that stripes are presented by changing the wavelength or color of light emitted by the light source. In the embodiment shown in FIG. 10, the light source includes a red lamp capable of emitting red light and a blue lamp capable of emitting blue light. Two signals in the upper part of FIG. 10 are a red light control signal and a blue light control signal, respectively, where a high level corresponds to the turn-on of the corresponding light source and a low level corresponds to the turn-off of the corresponding light source. The red light control signal and the blue light control signal are offset by 180° in phase, that is, the electrical levels of the two signals are opposite. The light source may be enabled to alternately emit red light and blue light by the red light control signal and the blue light control signal, so that red and blue stripes can be presented when the light source is imaged by the CMOS imaging device.

By determining whether there are stripes in a portion, corresponding to the light source, of an image photographed by the CMOS imaging device, the information (e.g., binary data 1 or 0) transferred by each image can be determined. Further, by photographing multiple successive images of the light source by the CMOS imaging device, an information sequence consisting of binary data 1 and 0 can be determined, so that the information transfer from the light source to the CMOS imaging device (e.g., the mobile phone) is realized. In an implementation, when multiple successive images of the light source are photographed by the CMOS imaging device, the controller may perform control such that the switching time interval between operating modes of the light source is equal to the time length of imaging one complete frame by the CMOS imaging device, thereby realizing frame synchronization of the light source and the imaging device, i.e., transmitting 1 bit of information per frame. At a photographing speed of 30 frames per second, 30 bits of information can be transferred per second, and the encoding space reaches $2^{30}$. For example, the information may include a starting frame sign (frame header), an ID of the optical tag, a password, a verification code, website information, address information, timestamp or different combinations thereof, or the like. The sequence of the above information may be set according to a structuration method to form a data packet structure. Once a complete data packet structure is received, this data packet structure is regarded as a set of complete data (a data packet), so that data reading and check analysis can be performed on the data packet structure. The data packet structure according to an embodiment of the present disclosure is shown in the following table:

| Frame header | Attribute (8 bit) | Data bit (32 bit) | Check bit (8 bit) | Frame tailer |
|---|---|---|---|---|

In the above description, the information transferred by each image is determined by determining whether there is a stripe at the imaging location of the light source in this image. In other embodiments, different information transferred by each image may also be determined by identifying different stripes at the imaging location of the light source in this image. For example, in the first mode, the attribute of light emitted by the light source is controlled by a light source control signal with a first frequency to continuously change at the first frequency, so that a first stripe can be presented on an image of the light source acquired when the light source is photographed by a CMOS image sensor; and, in the second mode, the attribute of light emitted by the light source is controlled by a light source control signal with a second frequency to continuously change at the second frequency, so that a second stripe different from the first stripe can be presented on the image of the light source acquired when the light source is photographed by the CMOS image sensor. For example, the difference between stripes may be based on different widths, colors, brightness or any combination thereof as long as the difference can be identified.

Figure 11:
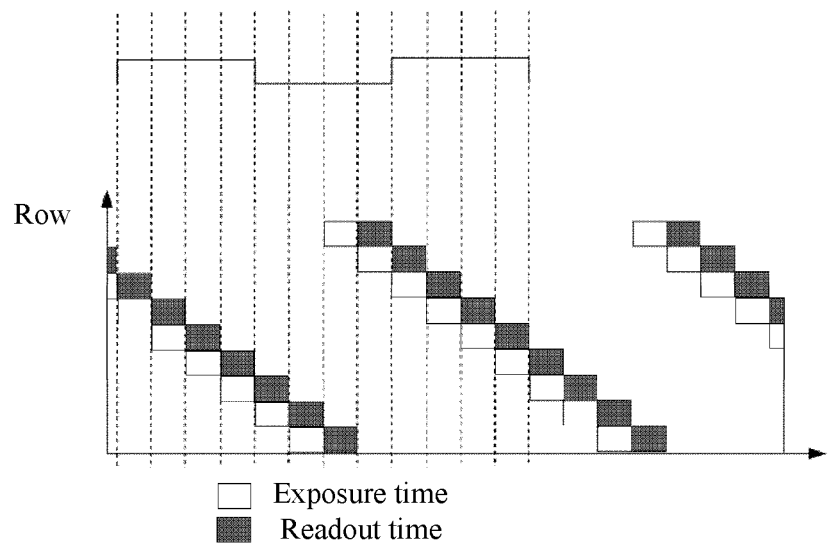
FIG. 11 shows an imaging sequence diagram of the CMOS imaging device for realizing stripes different from that in FIG. 8 according to another embodiment of the present disclosure.

In an embodiment, stripes with different widths may be realized based on different frequencies of the light source control signal. For example, in the first mode, the light source may operate in a way shown in FIG. 8, so that a first stripe having a width of about two pixels is realized; and, in the second mode, the duration of the high level and the duration of the low level of the light source control signal shown in FIG. 8 in each cycle are modified to two times the original duration, respectively, as specifically shown in FIG. 11, so that a second stripe having a width of about four pixels is realized.

In another embodiment, stripes with different colors can be realized. For example, the light source may include a red lamp capable of emitting red light and a blue lamp capable of emitting blue light. In the first mode, the blue lamp may be turned on, and the red lamp is allowed to operate in the way shown in FIG. 8, so that red black stripes are realized; and, in the second mode, the red lamp may be turned off, and the blue lamp is allowed to operate in the way shown in FIG. 8, so that blue black stripes are realized. In the above embodiment, the red black stripes and the blue black stripes are realized by light source control signals having the same frequency in the first mode and the second mode. However, it should be understood that light source control signals having different frequencies may be used in the first mode and the second mode.

In addition, it should be understood that more than two kinds of information may be further indicated by realizing more than two stripes. For example, in the embodiment in which the light source includes a red lamp and a blue lamp, a third mode may be further set. In the third mode, the red lamp and the blue lamp are controlled in a way shown in FIG. 10 to realize red blue stripes, i.e., a third information. It is apparent that, optionally, another kind of information (i.e., a fourth information) may be further transferred by presenting no stripe. More of the above four modes may be arbitrarily selected to transfer information, and other modes may also be further combined as long as different stripe patterns can be generated in different modes.

Figure 12:
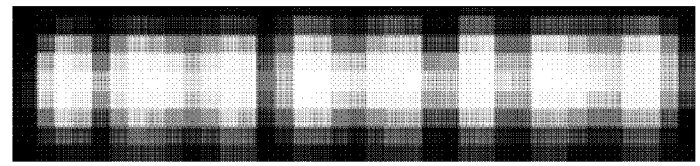
FIGS. 12-13 show two stripe images of the light source acquired under different settings.
Figure 13:
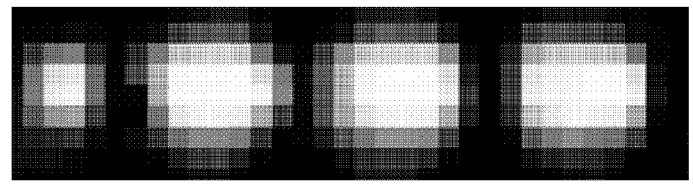
Figure 14:
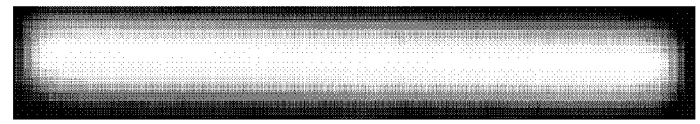
FIG. 14 shows the acquired stripe-free image of the light source.

FIG. 12 shows stripes on an image obtained through experiments in a case where an imaging device having a resolution of 1080 p is used for an LED lamp with a flicker frequency of 16000 times per second (the duration of each cycle is 62.5 µs, where the turn-on duration and the turn-off duration are each about 31.25 µs) and the exposure time for each row is set to be 14 µs. It can be seen from FIG. 12 that stripes having a width of about 2 to 3 pixels are presented. FIG. 13 shows stripes on an image obtained through experiments in a case where other conditions remain unchanged after the flicker frequency of the LED lamp in FIG. 12 is adjusted to be 8000 times per second (the duration of each cycle is 125 µs, where the turn-on duration and the turn-off duration are respectively about 62.5 µs). It can be seen from FIG. 13 that stripes having a width of about 5 to 3 pixels are presented. FIG. 14 shows that there are no stripes on an image obtained through experiments in a case where other conditions remain unchanged after the flicker frequency of the LED lamp in FIG. 12 is adjusted to be 64000 times per second (the duration of each cycle is 15.6 µs, where the turn-on duration and the turn-off duration are respectively about 7.8 µs). This is because one turn-on duration and one turn-off duration are basically contained in the exposure time of 14 µs for each row.

For convenience for description, the light source control signal having a corresponding frequency has been described above by taking square waves as an example. However, it should be understood that the light source control signal may also use other waveforms, such as sine waves or triangular waves.

Figure 15:
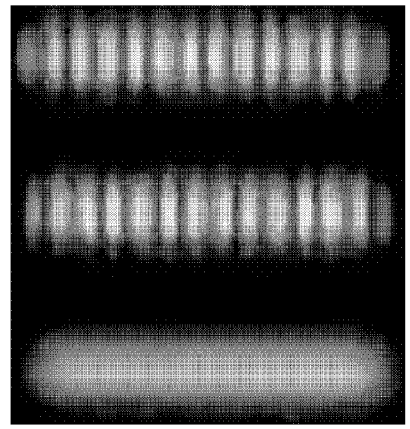
FIG. 15 is an imaging diagram of an optical tag using three independent light sources according to an embodiment of the present disclosure.

The case of using one light source has been described above; however, in some embodiments, two or more light sources may also be used. The controller can individually control the operation of each light source. FIG. 15 shows an imaging diagram of an optical tag using three independent light sources according to an embodiment of the present disclosure, where stripes appear at the imaging locations of two light sources; and, no stripe appears at the imaging location of one light source, and the image of this light source can be used to transfer information, for example, binary data 110.

Figure 16:
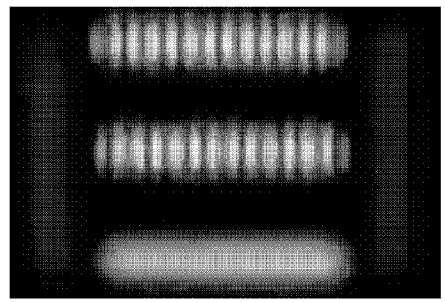
FIG. 16 is an imaging diagram of an optical tag including positioning markers according to an embodiment of the present disclosure.

In an embodiment, the optical tag may further include one or more positioning markers located near the light source that transfers information. For example, the positioning marker may be a lamp of a particular shape or color. For example, the lamp may be normally turned on during operation. The positioning marker can help the user of the CMOS imaging device (e.g., the mobile phone) to easily find the optical tag. In addition, when the CMOS imaging device is set to be in a mode of photographing the optical tag, the imaging of the positioning marker is obvious and easy to identify. Therefore, one or more positioning markers arranged near the light source that transfers information can also help the mobile phone to quickly determine the location of the light source that transfers information, thus helping in identifying whether there are stripes in the imaging area corresponding to the light source that transfers information. In an embodiment, in the process of identifying the presence of stripes, the positioning marker in the image may be first identified to determine the approximate location of the optical tag in the image. After the positioning marker is identified, one or more areas in the image may be determined based on the relative location relationship between the positioning marker and the light source that transfers information. The one or more areas cover the imaging location of the light source that transfers information. Then, these areas can be identified to determine whether there are stripes or what kind of stripes there are. FIG. 16 is an imaging diagram of the optical tag including positioning markers according to an embodiment of the present disclosure, where the optical tag includes three horizontally-arranged light sources that transfer information, and two positioning identification lamps vertically arranged on two sides of the light sources that transfer information.

In an embodiment, the optical tag may include an ambient light detection circuit that may be used to detect the intensity of the ambient light. The controller can adjust, based on the detected intensity of the ambient light, the intensity of light emitted by the light source when turned on. For example, when the intensity of the ambient light is relatively high (e.g., in the daytime), the intensity of light emitted by the light source is relatively high; and, when the intensity of the ambient light is relatively low (e.g., at night), the intensity of light emitted by the light source is relatively low.

In an embodiment, the optical tag may include an ambient light detection circuit that may be used to detect the frequency of the ambient light. The controller can adjust, based on the detected frequency of the ambient light, the frequency of light emitted by the light source when turned on. For example, when there is a light source that flashes at the same frequency in the ambient light, the light emitted by the light source is switched to another unoccupied frequency.

In an actual application environment, if there is a lot of noise or when the identification distance is very large, the accuracy of identification may be affected. Therefore, to improve the accuracy of identification, in an embodiment of the present disclosure, in addition to the light source that transfers information (for clarity, referred to as a "data light source" hereinafter), the optical tag may further include at least one reference light source. The reference light source itself is used for assisting in identifying the information transferred by the data light source, rather than transferring information. The reference light source may be similar to the data light source in the physical structure, but operates in a predetermined operating mode. This operating mode may be one or more of various operating modes of the data light source. In this way, the decoding of the data light source can be converted into the calculation of matching (e.g., correlation) with the image of the reference light source, so that the accuracy of decoding is improved.

Figure 17:
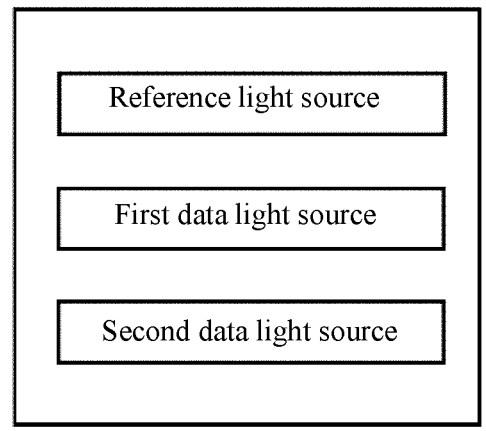
FIG. 17 shows an optical tag including a reference light source and two data light sources according to an embodiment of the present disclosure.

FIG. 17 shows an optical tag including a reference light source and two data light sources according to an embodiment of the present disclosure, where the three light sources are arranged side by side, the first light source is used as a reference light source, and the other two light sources are used as a first data light source and a second data light source, respectively. It is to be noted that, there may be one or more (but not limited to one) reference light sources in the optical tag; and similarly, there may be one or more (but not limited to two) data light sources. In addition, since the reference light source is used to provide assisted identification, the shape and size of the reference light source are not necessarily the same as those of the data light source. For example, in an implementation, the length of the reference light source may be half of that of the data light source.

In an embodiment, each of the first data light source and the second data light source shown in FIG. 17 is configured to be able to operate in three modes, for example, to present a stripe-free image, an image having a stripe width of 2 pixels and an image having a stripe width of 4 pixels, respectively. The reference light source may be configured to always operate in one of the three modes to present one of the three images, or alternately operate in different modes to alternately present any two or all of the three images in different frames, thereby providing a benchmark or reference for image identification of the data light source. By taking allowing the reference light source to alternately present an image having a stripe width of 2 pixels and an image having a stripe width of 4 pixels in different frames as an example, the image of the data light source in each frame may be compared with the images of the reference light source in the current frame and an adjacent frame (e.g., a previous frame or a next frame) (these images contain the image having a stripe width of 2 pixels and the image having a stripe width of 4 pixels), to determine the type of the image. Or, it is also possible that, multiple successive frames of the reference light source in a period of time are collected; images with odd frame numbers and images with even frame numbers are divided into groups, respectively; the features of each group of images are averaged (for example, an average value of stripe widths of each group of images is calculated); and, according to the stripe width, it is determined whether this group of images corresponds to the image having a stripe width of 2 pixels or the image having a stripe width of 4 pixels, so that an average feature of the image having a stripe width of 2 pixels and an average feature of the image having a stripe width of 4 pixels are obtained. Subsequently, it can be determined whether the image of the data light source in each frame conforms to one of these average features.

Since the reference light source and the data light source are located at approximately the same location and experience the same environmental lighting conditions, interference, noise or the like, one or more benchmark or reference images used for image identification can be provided in real time, so that the accuracy and stability of identification of the information transferred by the data light source can be improved. For example, the operating mode of the data light source can be accurately identified by comparing the image of the data light source with the image of the reference light source, so as to identify the data transferred by the data light source.

Further, in accordance with the imaging principle of the CMOS, when multiple light sources are changed in attribute at the same frequency and different phases, stripe patterns having the same width and different phases will be generated. The stripe patterns having the same width and different phases can be accurately determined by matching. In an embodiment, the reference light source may be controlled to operate in a predetermined operating mode. In this operating mode, for example, there will be a stripe having a width of 4 pixels on the image of the reference light source. At this time, if the data light source is also controlled to operate in this operating mode and the phase of the data light source is the same as that of the reference light source, the stripe presented on the image of the data light source is similar to the stripe presented on the image of the reference light source (for example, the width is also 4 pixels), and there is no phase difference; and, if the data light source is also controlled to operate in this operating mode and the phase of the data light source is not the same as that of the reference light source (for example, both are opposite or has a difference of 180°), the stripe presented on the image of the data light source is similar to the stripe presented on the image of the reference light source (for example, the width is also 4 pixels), but there is a phase difference.

Figure 18:
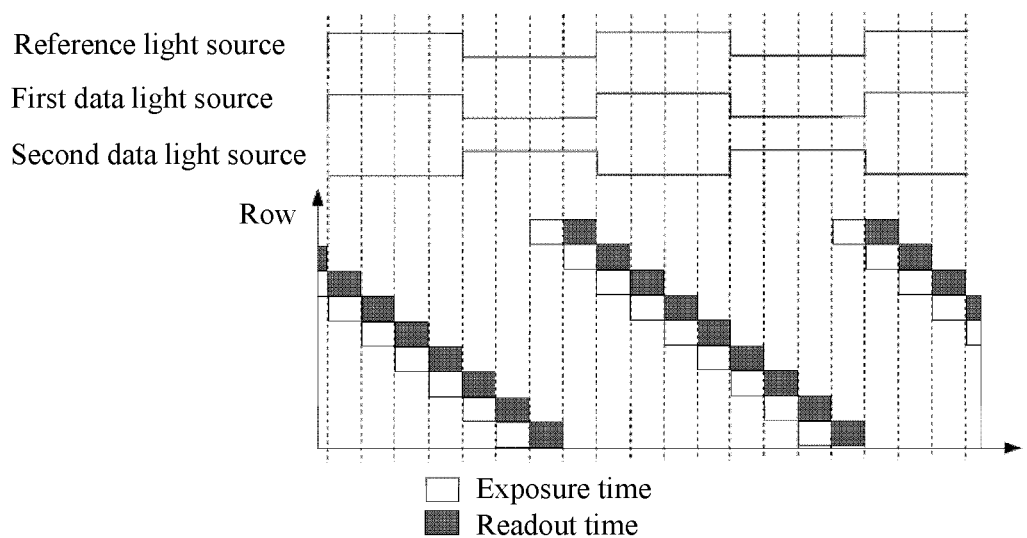
FIG. 18 shows an imaging sequence diagram of the CMOS imaging device for the optical tag shown in FIG. 17.

FIG. 18 shows an imaging sequence diagram of the CMOS imaging device for the optical tag shown in FIG. 17. The upper part of FIG. 18 shows the respective control signals for the reference light source, the first data light source and the second data light source, where a high level may correspond to the turn-on of the light source and a low level may correspond to the turn-off of the light source. As shown in FIG. 18, the three control signals are the same in frequency, the phase of the control signal for the first data light source is the same as that of the control signal for the reference light source, and the difference between the phase of the control signal for the second data light source and the phase of the control signal for the reference light source is 180°. In this way, when the optical tag is imaged by the CMOS imaging device, stripes having a width of about 4 pixels will be presented on the images of the reference light source, the first data light source and the second data light source; however, the stripes on the images of the first data light source and the reference light source are the same in phase (for example, the row where the bright stripe of the reference light source is located is the same as the row where the bright stripe of the first data light source is located, and the row where the dark stripe of the reference light source is located is the same as the row where the dark stripe of the first data light source is located), and the stripes on the images of the second data light source and the reference light source are opposite in phase (for example, the row where the bright stripe of the reference light source is located is the same as the row where the dark stripe of the second data light source is located, and the row where the dark stripe of the reference light source is located is the same as the row where the bright stripe of the second data light source is located).

By providing the reference light source and controlling the phase of the data light source, the amount of information that can be transferred by the data light source each time can be further increased while improving the identification capability. For the optical tag shown in FIG. 17, if the first data light source and the second data light source are configured to be able to operate in the first mode and the second mode, where no stripe will be presented in the first mode, and stripes will be presented in the second mode. If no reference light source is provided, each data light source can transfer one of two types of data (e.g., 0 or 1) in one image. Moreover, by providing the reference light source and allowing the reference light source to operate in the second mode, and by further providing phase control when the data light source operates in the second mode, the second mode itself can be used to transfer more than one type of data. By taking the way shown in FIG. 18 as an example, in combination with the phase control, the second mode itself can be used to transfer one of two types of data, so that each data light source can transfer one of three types of data in one image.

In the above way, by introducing the reference light source, the phase control of the data light source is realized. Accordingly, the coding density of the data light source of the optical tag can be improved, and the coding density of the whole optical tag can be correspondingly improved. For example, in the embodiments described above, if no reference light source is used (that is, the reference light source is used as a third data light source), each data light source can transfer one of two types of data in one image, so that the whole optical tag (including three data light sources) can transfer one of $2^3$ data combinations in one image; however, if the reference light source is used, each data light source can transfer one of three types of data in one image, so that the whole optical tag (including two data light sources) can transfer one of $3^2$ data combinations in one image. If the number of data light sources in the optical tag is increased, the effect will be more obvious. For example, in the embodiments described above, if an optical tag includes five light sources, when no reference light source is used, the whole optical tag (including five data light sources) can transfer one of $2^5$ data combinations; however, when one of light sources is selected as a reference light source, the whole optical tag (including four data light sources) can transfer one of $3^4$ data combinations in one image. Similarly, by increasing the number of reference light sources in the optical tag, the coding density of the whole optical tag can be further improved. Some experimental data will be provided below for matching calculation (e.g., correlation calculation) of the image of the data light source and the image of the reference light source. The meanings of the calculation results are defined as follows:

| | |
|---|---|
| 0.00~±0.30 | Slightly correlated |
| ±0.30~±0.50 | Truly correlated |
| ±0.50~±0.80 | Significantly correlated |
| ±0.80~±1.00 | Highly correlated | where the positive value represents positive correlation, and the negative value represents negative correlation. If the data light source and the reference light source are the same in both frequency and phase, ideally, the images of the two light sources are identical, so that the result of the correlation calculation is +1, which represents perfect positive correlation. If the data light source and the reference light source are the same in frequency but opposite in phase, ideally, the images of the two light sources are the same in stripe width, but bright and dark stripes are opposite in location, so that the result of the correlation calculation is −1, which represents perfect negative correlation. It should be understood that, in the actual imaging process, due to the presence of interference, error or the like, it is difficult to obtain perfectly positively correlated images and perfectly negatively correlated images. If the data light source and the reference light source operate in different operating modes to present stripes with different widths or one of the data light source and the reference light source does not present any stripe, the images of the data light source and the reference light source are usually slightly correlated to each other.

The following tables 1 and 2 show the results of correlation calculation when the data light source and the reference light source use the same frequency and the same phase and the results of correlation calculation when the data light source and the reference light source use the same frequency and opposite phases, respectively. In each case, five images are photographed, and correlation calculation is performed on the image of the reference light source in each frame and the image of the data light source in this frame.

TABLE 1

Results of correlation calculation in the case of the same frequency and the same phase

| | Data image 1 | Data image 2 | Data image 3 | Data image 4 | Data image 5 |
|---|---|---|---|---|---|
| Reference image 1 | 0.7710 | | | | |
| Reference image 2 | | 0.7862 | | | |
| Reference image 3 | | | 0.7632 | | |
| Reference image 4 | | | | 0.7883 | |
| Reference image 5 | | | | | 0.7967 |

TABLE 2

Results of correlation calculation in the case of the same frequency and opposite phases

| | Data image 1 | Data image 2 | Data image 3 | Data image 4 | Data image 5 |
|---|---|---|---|---|---|
| Reference image 1 | −0.7849 | | | | |
| Reference image 2 | | −0.7786 | | | |
| Reference image 3 | | | −0.7509 | | |
| Reference image 4 | | | | −0.7896 | |
| Reference image 5 | | | | | −0.7647 |

It can be known from the above tables that, when the data light source and the reference light source use the same frequency and the same phase, the results of correlation calculation may indicate that the two are significantly positively correlated. When the data light source and the reference light source use the same frequency and opposite phases, the results of correlation calculation may indicate that the two are significantly negatively correlated.

Compared with the identification distance of about 15 times in the QR code in the prior art, the identification distance of at least 200 times in the optical tag of the present disclosure has obvious advantages. The long-distance identification capability is particularly suitable for outdoor identification. By taking an identification distance of 200 times as an example, for a light source having a length of 50 cm arranged on the street, a person within 100 m away from this light source can interact with this light source through a mobile phone. In addition, in the schemes of the present disclosure, it is not required that the imaging device is located at a fixed distance away from the optical tag, nor that the time is synchronized between the imaging device and the optical tag, and there is no need to accurately detect the boundary and width of each stripe. Therefore, the imaging device has extremely high stability and reliability during the actual information transfer process. In addition, in the schemes of the present disclosure, it is not required that the imaging device directly face the optical tag roughly for identification, especially for an optical tag having a strip-shaped or spherical light source. For example, for a strip-shaped or cylindrical optical tag arranged in a square, the optical tag may be identified by imaging devices within 360° around the optical tag. If the strip-shaped of cylindrical optical tag is arranged on a wall, the optical tag may be identified by imaging devices within 180° around the optical tag. For a spherical optical tag arranged in a square, the optical tag may be identified by imaging devices at any location in the three-dimension space around the optical tag.

The optical tag may be used to realize accurate guidance in a field of view, for example, guiding a machine capable of autonomous movement. It should be specifically emphasized that, although an optical tag identified by a CMOS imaging device has been described above in detail, this optical tag is merely an example of optical tags. The scheme of guiding by means of an optical tag in the present disclosure is not limited to the optical tag, and it is not required that the optical tag realize an identification distance of at least 200 times, as long as the optical tag can be identified by various optical cameras (e.g., CMOS or CCD cameras) mounted on nearby machines capable of autonomous movement (e.g., unmanned aerial vehicles).

Figure 19:
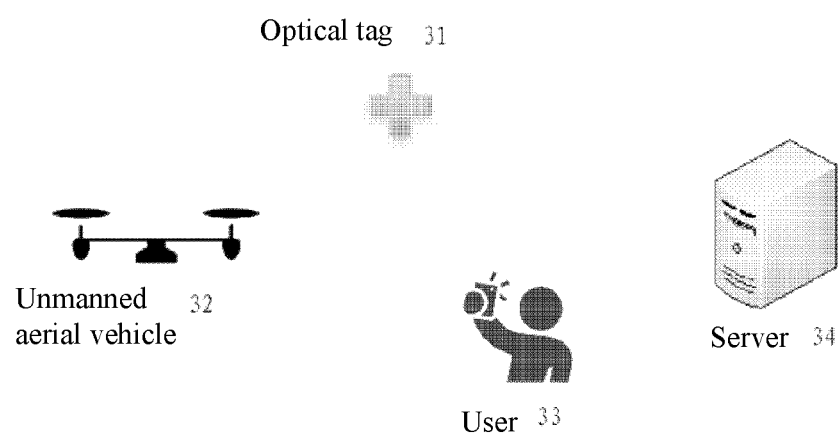
FIG. 19 shows a system for guiding an unmanned aerial vehicle by means of an optical tag according to an embodiment of the present disclosure.

An embodiment of the present disclosure relates to a system for guiding a machine capable of autonomous movement (e.g., an unmanned aerial vehicle) by means of an optical tag. As shown in FIG. 19, the system includes a server 34, an unmanned aerial vehicle 32 and the optical tag 31 described in any one of the above embodiments. The server 34 may store identification information and accurate location information of the optical tag 31 (e.g., accurate latitude and longitude, height information or the like of the optical tag 31). The server 34 may also store other related information of the optical tag 31, for example, size, orientation or the like. A camera is mounted on the unmanned aerial vehicle 32, and the unmanned aerial vehicle 32 can acquire and identify the information transferred by the optical tag 31. For example, the unmanned aerial vehicle 32 can identify the identification information transferred by the optical tag 31, and inquire the location information and other optional related information of the optical tag 31 from the server 34 by using the identification information. With this system, the unmanned aerial vehicle 32 can be accurately guided to the location where a user 33 is located.

The following description will be given by taking a delivery application of online shopping by using an unmanned aerial vehicle as an example. When a user may want to shop online during an outdoor activity (e.g., playing in a square or a park, or shopping) and hope that the goods can be delivered to a certain location. The location may be a current location of the user, or a location to which the user will travel (e.g., a location of the user when the unmanned aerial vehicle arrives), or a location of another user (e.g., a friend of the user) who will receive the goods, or the like. Therefore, during the online shopping, the user may input, on an online shopping platform, location information for indicating destination of the goods delivery via the unmanned aerial vehicle. The location information may be located near but not precisely at a certain optical tag. The location information may be provided by various feasible methods in the prior art. For example, the location information may be manually input by a user, selected from a map, or provided by a positioning module (e.g., GPS) in the user's mobile phone. In an embodiment, the user may provide more accurate location information to the online shopping platform by means of an optical tag around the user. For example, the user may scan and identify one or more optical tags around the user by using an imaging device (e.g., a mobile phone) so as to acquire identification information of the optical tag. Subsequently, accurate location information of the optical tag is inquired by using the identification information, and the accurate location information is provided as the goods delivery destination. Optionally, the user may further determine a relative location relationship between the user and the optical tag, so that the current accurate location information of the user can be determined based on the accurate location information of the optical tag, and this current location information is used as the goods delivery destination. The relative location relationship between the imaging device and the optical tag may be determined based on the image of the optical tag by various relative positioning (also referred to as reverse positioning) methods known in the art. In an embodiment, the relative distance between the imaging device and the optical tag may be determined (for example, by using the imaging size of the optical tag, or by any application with a ranging function in the mobile phone), and the relative location relationship between the imaging device and the optical tag is determined by triangulation positioning using two or more optical tags. In an embodiment, the relative location relationship between the imaging device and the optical tag may be determined by analyzing the size and perspective distortion of the image of the optical tag on the imaging device. In an embodiment, during the determination of the relative location relationship between the imaging device and the optical tag, the size information and/or orientation information or the like is further used. The size information and/or orientation information may be stored in the server in association with the identification information of the optical tag. The optical tag may have a uniform physical size. In an embodiment, the current orientation information of the mobile phone may be acquired by a built-in sensor of the mobile phone, and the relative direction between the user and the optical tag is obtained based on the orientation information (for example, the relative direction between the user and the optical tag can be further determined more accurately in combination with the location of the optical tag in the image). In addition, many imaging devices currently available in current market are usually equipped with binocular cameras or depth cameras, images of optical tags are acquired by the imaging devices equipped with binocular cameras or depth cameras, so that the relative distance between the imaging devices and the optical tags can be easily obtained. In another embodiment, to determine the relative direction between a user and an optical tag, the orientation information of the optical tag may be stored in a server. After the user identifies the identification information of the optical tag, the orientation information can be acquired from the server by using the identification information. Then, based on the orientation information of the optical tag and the perspective distortion of the image of the optical tag on the user's mobile phone, the relative direction between the user and the optical tag can be calculated.

After the user has finished shopping through the online shopping platform, the online shopping platform may dispatch an unmanned aerial vehicle to deliver goods to the location. During the goods delivery, the user may alter the location information for indicating the goods delivery destination of the unmanned aerial vehicle. For example, when a user plays in a square or a park, the location of the user may change constantly. Therefore, the user may regularly send the real-time location as a new goods delivery destination to the online shopping platform, so that the online shopping platform can inform the real-time location of the user to the unmanned aerial vehicle.

Figure 20:
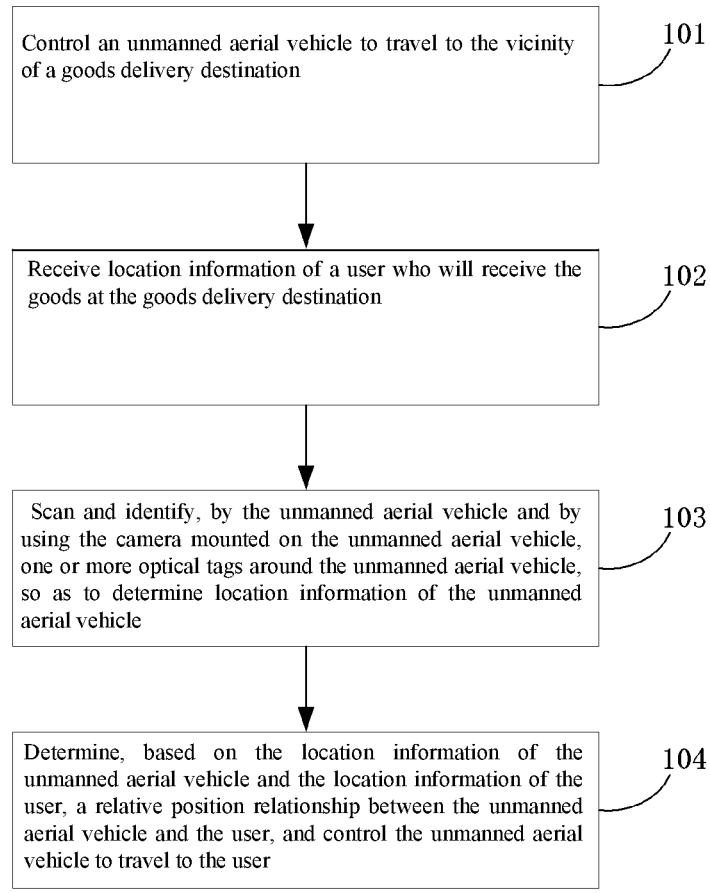
FIG. 20 shows a method for guiding an unmanned aerial vehicle by means of an optical tag according to an embodiment of the present disclosure.

As shown in FIG. 20, a method for guiding an unmanned aerial vehicle by means of an optical tag according to an embodiment of the present disclosure may specifically include the following steps.

At Step 101, the unmanned aerial vehicle is controlled to travel to the vicinity of a goods delivery destination.

After the unmanned aerial vehicle gets the goods to be delivered to a user, based on the location information that is provided to an online shopping platform by the user and used for indicating a goods delivery destination, the unmanned aerial vehicle can fly to this destination. In an embodiment, during the goods delivery by the unmanned aerial vehicle, the destination may be changed. When the destination is changed, the location information of a new destination can be transmitted to the unmanned aerial vehicle, so that the unmanned aerial vehicle can travel to the new destination. The step 101 may be implemented by various existing possible methods in the art. For example, the unmanned aerial vehicle can fly to the vicinity of the goods delivery destination by GPS navigation or in other ways. The existing GPS navigation may reach an accuracy range of tens of meters.

It is to be noted that the step 101 is not a necessary step for the method of the present disclosure and may be omitted in some cases. For example, the goods delivery destination is already near the unmanned aerial vehicle, for example, within the field of view of the unmanned aerial vehicle.

At Step 102, the location information of a user who will receive the goods at the goods delivery destination (i.e., information of the location where the goods is finally delivered) is received, wherein the location information is determined by scanning and identifying one or more optical tags around the user.

As mentioned above, the user who will receive the goods may be the user who shopped online, or may be another user, such as a friend of the user. In an embodiment, after the unmanned aerial vehicle arrives in the vicinity of the goods delivery destination, the unmanned aerial vehicle can inform the online shopping platform, so that the online shopping platform can inform the user who will receive the goods of providing the location information of this user. In another embodiment, the user can actively provide the location information of the user. The location information of the user may be received by a third party (e.g., an online shopping platform), or may be further received by the unmanned aerial vehicle. For example, the location information is transferred to the unmanned aerial vehicle by the third party.

The user may scan and identify one or more optical tags around the user by an imaging device with a camera (e.g., a mobile phone), so as to determine the location information of the user. For example, if an optical tag is arranged in a square or a park, the user may set a delivery destination of the unmanned aerial vehicle near the optical tag. When the unmanned aerial vehicle arrives in the vicinity of the optical tag, the user may scan and identify this optical tag so as to determine the location information of the user.

Specifically, the user may acquire information transferred by a certain surrounding optical tag and identify the transferred information by the carry-on mobile phone. For example, the user may acquire multiple successive images of a certain optical tag by the camera of the mobile phone; and then, for each image, it is determined whether there are stripes or what type of stripes exist in a portion of the image corresponding to the location of the light source, so that the information represented by each frame is determined. In this way, the identification information of the optical tag can be acquired. Then, accurate location information of the optical tag is inquired by using the identification information, and a relative location relationship between the user and the optical tag is determined, so that current location information of the user can be determined. The relative location relationship between the user (actually the imaging device of the user) and the optical tag can be determined, based on the image of the optical tag acquired by the imaging device of the user, by various relative positioning methods known in the art.

At Step 103, the unmanned aerial vehicle scans and identifies one or more optical tags around the unmanned aerial vehicle by the camera mounted on the unmanned aerial vehicle, so as to determine location information of the unmanned aerial vehicle.

The unmanned aerial vehicle can find optical tags in its field of view, and then acquire information transferred by a certain optical tag and identify the transferred information by the camera mounted on the unmanned aerial vehicle, so as to obtain identification information of the optical tag. Then, accurate location information of the optical tag is inquired by using the identification information, and a relative location relationship between the unmanned aerial vehicle and the optical tag is determined, so that current location information of the unmanned aerial vehicle can be determined. The relative location relationship between the unmanned aerial vehicle and the optical tag can be determined, based on the image of the optical tag acquired by the unmanned aerial vehicle, by various relative positioning methods known in the art.

It is to be noted that the optical tag scanned by the camera of the unmanned aerial vehicle and the optical tag scanned by the user may be identical, different or partially identical. For example, when there are a plurality of optical tags at the goods delivery destination, the optical tag scanned by the unmanned aerial vehicle and the optical tag scanned by the user may be different, which will not affect the determination of the corresponding location information by the unmanned aerial vehicle or the user.

At Step 104, a relative location relationship between the unmanned aerial vehicle and the user is determined based on the location information of the unmanned aerial vehicle and the location information of the user, and then the unmanned aerial vehicle is controlled to travel to the user.

As mentioned above, in the step 101, the unmanned aerial vehicle already travels to the vicinity of the goods delivery destination, for example, within a range of tens of meters. At this time, a user who will receive the goods is also near the goods delivery destination. Therefore, the relative distance between the unmanned aerial vehicle and the user who will receive the goods will not be too large. After the relative location relationship between the unmanned aerial vehicle and the user is determined based on the location information of the unmanned aerial vehicle and the location information of the user, the unmanned aerial vehicle can travel to the location of the user accurately by some existing navigation methods (e.g., inertial navigation) and then deliver the goods. In an embodiment, the location information of the unmanned aerial vehicle and the location information of the user may be received by a third party (e.g., an online shopping platform), and the relative location relationship between the unmanned aerial vehicle and the user is then determined. After the relative location relationship is determined, the relative location relationship can be transmitted to the unmanned aerial vehicle. In an embodiment, the location information of the user can be received by the unmanned aerial vehicle, and the relative location relationship between the unmanned aerial vehicle and the user is then determined.

In some embodiments, in an embodiment, during the traveling process, the unmanned aerial vehicle can further determine its current location by scanning and identifying optical tags around the unmanned aerial vehicle, thereby helping the unmanned aerial vehicle to accurately travel to the location of the user. Upon arriving at the location of the user, the unmanned aerial vehicle can deliver the goods.

By this method, one or more optical tags can be used as positioning anchors to determine the accurate relative location relationship between the unmanned aerial vehicle and the user, so that the problem of goods delivery within last tens of meters by the unmanned aerial vehicle is solved.

In an embodiment, the online shopping platform can inform the user of the estimated arrival time of the unmanned aerial vehicle, so that the user can move freely in this period of time as long as the user returns to the vicinity of the goods delivery destination at the estimated arrival time. In an embodiment, the user may also set the good delivery destination as a certain address where the user expects to arrive at a certain moment and then instruct the online shopping platform to deliver the goods to the vicinity of the address at this moment. After the user arrives in the vicinity of the goods delivery destination, the user can actively provide the location information that is obtained by scanning and identifying one or more surrounding optical tags.

Although the above description is given by taking the delivery application of online shopping by using an unmanned aerial vehicle as an example, it should be understood that the guidance of an unmanned aerial vehicle by means of optical tags is not limited to the above application and may be used in various applications that require accurate positioning of the unmanned aerial vehicle, for example, automatic charging of the unmanned aerial vehicle, automatic parking of the unmanned aerial vehicle, route navigation of the unmanned aerial vehicle or the like.

In addition, it should be understood that the guidance based on an optical tag in the present disclosure is not only applicable to unmanned aerial vehicles, but also applicable to other types of machines capable of autonomous movement, for example, driverless vehicles, robots or the like. Cameras may be mounted on the driverless vehicles or robots, and the driverless vehicles or robots can interact with optical tags in a similar way to unmanned aerial vehicles. In an embodiment, a portion of the machine capable of autonomous movement is movable, while the other portion thereof is fixed. For example, the machine capable of autonomous movement may be a machine which is usually located at a fixed location on a production line or in a warehouse, and the main body of the machine may be fixed in most cases but has one or more movable mechanical arms. A camera may be mounted in the fixed portion of the machine to determine the location of an optical tag, so that the movable portion (e.g., mechanical arm) of the machine can be guided to the location of the optical tag. Apparently, the step 101 described above is optional for this machine. In addition, it should be understood that the camera may also be mounted in the movable portion of the machine, for example, being mounted on each mechanical arm.

Figure 21:
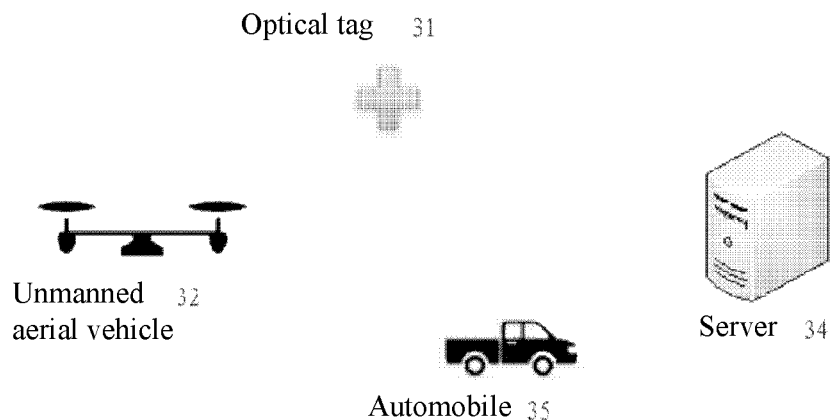
FIG. 21 shows a system for guiding an unmanned aerial vehicle by means of an optical tag according to another embodiment of the present disclosure.

In an embodiment, an unmanned aerial vehicle or other one machine capable of autonomous movement may be guided to the location of another machine rather than the location of the user, as long as the another machine is also equipped with a camera. The another machine can acquire, by the camera of this machine, information transferred by a certain surrounding optical tag and then identify the transferred information so as to acquire identification information of this optical tag. Then, accurate location information of the optical tag is inquired by using the identification information, and a relative location relationship between the another machine and the optical tag is determined, so that current location information of the another machine can be determined. FIG. 21 shows such a system. Compared with FIG. 19, the user 33 is replaced with an automobile 35 with a camera. For example, the camera may be mounted on the roof of the automobile 35.

Herein, references to "various embodiments", "some embodiments", "an embodiment", "embodiments" or the like mean that particular features, structures or properties described in conjunction with the embodiment/embodiments are included in at least one embodiment. Therefore, the phrase "in various embodiments", "in some embodiments", "in an embodiment", "in some embodiments" or the like appears in various locations throughout this specification and unnecessarily refers to the same embodiment. Additionally, particular features, structures or properties can be combined in one or more embodiments in any suitable way. Therefore, particular features, structures or properties shown or described in conjunction with an embodiment can be completely or partially combined with the features, structures or properties in one or more other embodiments without limitation, as long as the combination is not illogical or inoperative. The expression such as "according to A" or "based on A" used herein is non-exclusive, that is, the expression "according to A" may cover "merely according to A", or may cover "according to A and B", unless specifically stated or clearly understood from the context that it means "merely according to A". In the present disclosure, for clarity, some schematic operation steps are described in a certain order; however, it should be understood that, not every one of the operation steps is essential, and some of the steps may be omitted or replaced with other steps. The operation steps are not necessarily executed in sequence as shown. On the contrary, some of the operation steps can be executed in a different order or in parallel according to actual needs, as long as the new execution mode is not illogical or inoperative.

Several aspects of at least one embodiment of the present disclosure have been described, but various alterations, modifications and improvements are contemplated. These alterations, modifications and improvements shall fall into the spirit and scope of the present disclosure.

What is claimed is:

1. A method for guiding a machine configured for autonomous movement by means of an optical communication device, wherein the optical communication device has associated identification information, location information and orientation information, and a camera is mounted on the machine configured for autonomous movement, the method comprising:

receiving location information of a destination to which the machine configured for autonomous movement travels, the location information of the destination being determined by scanning and identifying, at the destination, at least one optical communication device around the destination;

scanning and identifying, by the camera mounted on the machine configured for autonomous movement, the optical communication device around the machine to determine location information of the machine configured for autonomous movement, wherein, the location information of the machine is determined based on the location information of the optical communication device and a relative location relationship between the machine and the optical communication device, wherein the relative location relationship includes a relative distance and a relative direction, and wherein the orientation information of the optical communication device is used when determining the relative direction; and determining, based on the location information of the destination and the location information of the machine configured for autonomous movement, a relative location relationship between the machine and the destination, and controlling the machine or a portion thereof to travel to the destination.

2. The method of claim 1, wherein the identification information, location information and orientation information of the optical communication device are stored in a server.

3. The method of claim 1, further comprising, scanning and identifying, by the machine configured for autonomous movement, optical communication devices around it when it travels to the destination, to determine its real-time location to help it to travel to the destination.

4. The method of claim 1, wherein scanning and identifying, by the camera mounted on the machine configured for autonomous movement, the at least one optical communication device around the machine to determine location information of the machine configured for autonomous movement further comprises:

identifying information transmitted by the optical communication device to obtain the identification information of the optical communication device;

inquiring the location information and the orientation information of the optical communication device from the server by using the identification information;

determining the relative location relationship between the machine configured for autonomous movement and the optical communication device; and determining, based on the relative location relationship and the location information of the optical communication device, the location information of the machine configured for autonomous movement.

5. The method of claim 4, wherein determining the relative location relationship between the machine configured for autonomous movement and each optical communication device further comprises:

determining, based on an image of the optical communication device obtained by the machine configured for autonomous movement, the relative location relationship between the machine and the optical communication device by relative positioning.

6. The method of claim 4, wherein the identifying information transmitted by the optical communication device further comprises:

acquiring multiple successive images of the optical communication device by the camera; and for each image, determining whether there are stripes or what type of stripes exist in a portion of the image corresponding to the location of the light source; and determining information represented by each image.

7. The method of claim 4, further comprising:

inquiring size information of the optical communication device stored in the server by using the identification information.

8. The method of claim 1, wherein determining the location information of the destination by scanning and identifying, at the destination, the at least one optical communication device around the destination further comprises:

identifying, by an imaging device with a camera located at the destination, information transmitted by the optical communication device to obtain the identification information of the optical communication device;

inquiring the location information of the optical communication device from the server by using the identification information;

determining a relative location relationship between the imaging device and the optical communication device; and determining, based on the relative location relationship and the location information of the optical communication device, location information of the imaging device as location information of the destination.

9. The method of claim 8, wherein the imaging device is held by a user or mounted on another machine.

10. The method of claim 8, wherein the identifying information transmitted by the optical communication device further comprises:

acquiring multiple successive images of the optical communication device by the camera;

for each image, determining whether there are stripes or what type of stripes exist in a portion of the image corresponding to the location of the light source; and determining information represented by each image.

11. The method of claim 8, further comprising:

inquiring size information of the optical communication device stored in the server by using the identification information.

12. The method of claim 1, further comprising: controlling the machine configured for autonomous movement to travel to the vicinity of the destination.

13. The method of claim 1, wherein the optical communication device comprises a light source configured to operate in at least two modes comprising a first mode and a second mode, wherein the method further comprises:

controlling, in the first mode, an attribute of light emitted by the light source, by a light source control signal with a first frequency, to continuously change at the first frequency so that a stripe is presented on an image of the light source acquired by a rolling-shutter camera; and controlling, in the second mode, the attribute of light emitted by the light source so that no stripe or a stripe different from the stripe in the first mode is presented on the image of the light source acquired when the light source is photographed by the rolling-shutter camera.

14. The method of claim 13, wherein controlling the attribute of light emitted by the light source in the second mode further comprises:

controlling the attribute of light emitted by the light source, by a light source control signal with a second frequency different from the first frequency, to continuously change at the second frequency so that no stripe or a stripe different from the stripe in the first mode is presented on the image of the light source acquired when the light source is photographed by the rolling-shutter camera.

15. The method of claim 13, wherein controlling the attribute of light emitted by the light source in the second mode further comprises:

controlling the attribute of light emitted by the light source to continuously change at the first frequency, and a stripe different from the stripe in the first mode is presented on the image of the light source acquired when the light source is photographed by the rolling-shutter camera.

16. The method of claim 1, wherein only a portion of the machine configured to autonomous movement moves.

17. A machine configured for autonomous movement, comprising a camera, a processor and a memory, the memory storing computer programs which, when executed by the processor, implement a method for guiding the machine configured for autonomous movement, the method comprising:

receiving location information of a destination to which the machine configured for autonomous movement travels, wherein the location information of the destination is determined by scanning and identifying, at the destination, at least one optical communication device around the destination;

scanning and identifying, by a camera mounted on the machine configured for autonomous movement, the at least one optical communication device around the machine to determine location information of the machine configured for autonomous movement, wherein the location information of the machine is determined based on location information of the optical communication device and a relative location relationship between the machine and the optical communication device, wherein the relative location relationship includes a relative distance and a relative direction, and wherein orientation information of the optical communication device is used when determining the relative direction; and determining, based on the location information of the destination and the location information of the machine configured for autonomous movement, a relative location relationship between the machine and the destination, and controlling the machine or a portion thereof to travel to the destination.

18. The machine of claim 17, wherein the optical communication device comprises a light source configured to operate in at least two modes comprising a first mode and a second mode; and wherein, in the first mode, an attribute of light emitted by the light source is controlled, by a light source control signal with a first frequency, to continuously change at the first frequency so that a stripe is presented on an image of the light source acquired by a rolling-shutter camera; and, in the second mode, no stripe or a stripe different from the stripe in the first mode is presented on the image of the light source acquired when the light source is photographed by the rolling-shutter camera.

19. A non-transitory computer-readable storage medium storing computer programs which, when executed, implement a method for guiding a machine configured for autonomous movement, the method comprising:

receiving location information of a destination to which the machine configured for autonomous movement travels, wherein the location information of the destination is determined by scanning and identifying, at the destination, at least one optical communication device around the destination;

scanning and identifying, by a camera mounted on the machine configured for autonomous movement, the at least one optical communication device around the machine to determine location information of the machine configured for autonomous movement, wherein, the location information of the machine is determined based on location information of the optical communication device and a relative location relationship between the machine and the optical communication device, wherein the relative location relationship includes a relative distance and a relative direction, and wherein orientation information of the optical communication device is used when determining the relative direction; and determining, based on the location information of the destination and the location information of the machine configured for autonomous movement, a relative location relationship between the machine and the destination, and controlling the machine or a portion thereof to travel to the destination.

20. The non-transitory computer-readable storage medium of claim 19, wherein the optical communication device comprises a light source configured to operate in at least two modes comprising a first mode and a second mode, wherein the method further comprises:

controlling, in the first mode, an attribute of light emitted by the light source, by a light source control signal with a first frequency, to continuously change at the first frequency so that a stripe is presented on an image of the light source acquired when the light source is photographed by a rolling-shutter camera; and controlling, in the second mode, the attribute of light emitted by the light source so that no stripe or a stripe different from the stripe in the first mode is presented on the image of the light source acquired when the light source is photographed by the rolling-shutter camera.

* * * * *